Figure 2:
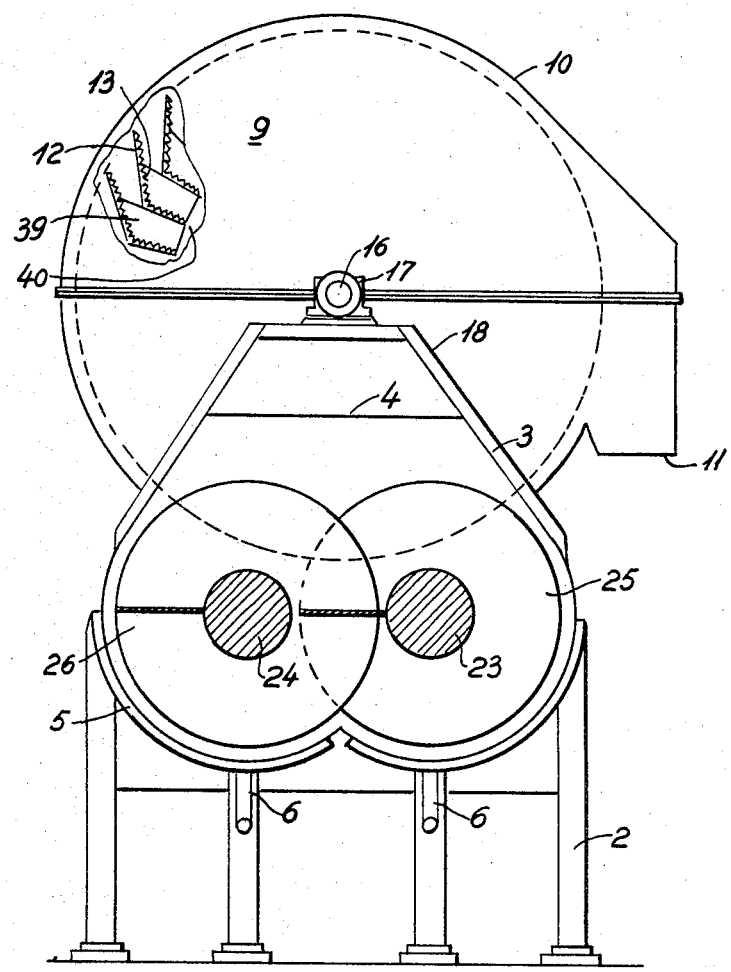

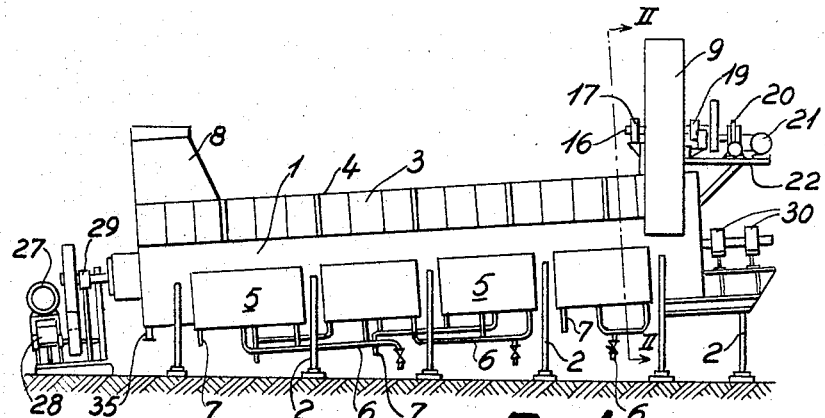
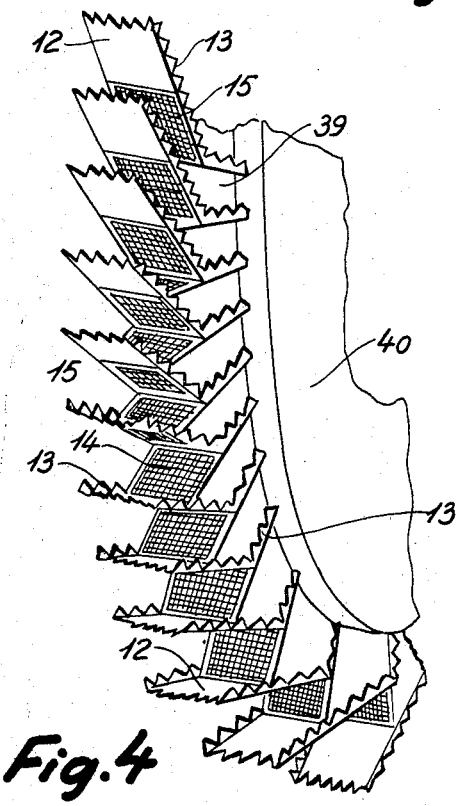

3,433,598
LIXIVIATING APPARATUS
Axel Valdemar Faaborg-Andersen, Rungsted Kyst, and Poul Jensen, Hellerup, Denmark, assignors to Aktieselskabet de Danske Sukkerfabrikker, Copenhagen, Denmark
Filed Nov. 4, 1965, Ser. No. 506,338
Claims priority, application Denmark, Nov. 10, 1964, 5,539/64
U.S. Cl. 23—270          3 Claims
Int. Cl. B01d *11/02*

This invention relates to a continuous lixiviating apparatus of the type comprising a trough, at least two conveyors mounted in said trough for rotation about mutually parallel axes extending longitudinally of said trough, each of said conveyors having conveying means, in the following referred to as principal conveying means disposed at an inclination to the circumferential direction of the conveyor considered, said conveyors being adapted to transport disintegrated material supplied to one end of said trough in a principal direction of transportation towards a discharge apparatus mounted at the other end of said trough, in counter current to a lixiviating liquid.

In such lixiviating apparatuses the discharge apparatus is normally mounted so as to discharge the lixiviated material from said trough in a direction perpendicular to or almost perpendicular to the axes of the conveyors. When used for the lixiviation of sliced sugar beets or other slippery materials, such lixiviating apparatuses may be provided with an inclined discharge end wall in said trough adapted to raise the lixiviated material to a level above the axes of said conveyors when said material is pressed against said inclined end wall under the influence of the conveying means of said conveyors. After being raised from the bottom of said trough, the lixiviated material may be picked up by the buckets of a bucket wheel mounted close to the discharge end of the trough and at such a distance above the bottom of said trough that said buckets will pass immediately above the axes of said conveyors.

When used for the lixiviation of disintegrated straw, sugar cane and other fibrous non-slippery materials the lixiviating apparatuses of the above mentioned type are unsuitable in view of the fact that the fibrous material tends to stick to the inclined end wall forming a strongly coherent mass, which, due to the special character of such fibrous materials, is even further compressed against said end wall under the influence of increased mechanical pressure, thus preventing lixiviated material from sliding along said end wall and from reaching the path in which the buckets of the bucket wheel are moving.

Therefore, the removal of such fibrous non-slippery materials has previously been effected by means of elevators or screw conveyors mounted at the discharge end of the lixiviation trough and extending below the bottom of said trough. However, since the conveying means of such discharge apparatuses are loaded at the bottom of said trough with lixiviated material soaked with lixiviating liquid, substantial amounts of lixiviating liquid will be removed from the lixiviating apparatus together with the lixiviated material. Thus excessive amounts of press liquid are formed during the subsequent pressing operation.

Furthermore, such elevators and screw conveyors mounted at the end of the trough will form an obstacle to the provision of driving means for the conveyors at the discharge end of the trough and will thus make it difficult to construct high capacity lixiviating apparatuses because these should preferably be provided with driving means at both ends of the shafts of the conveyors.

The object of the invention is to provide a lixiviating apparatus eliminating said drawbacks of the above mentioned apparatuses thus making said apparatuses more suitable for the lixiviation of fibrous materials such as the lixiviation of sugar from disintegrated sugar cane and the treatment of straw for use in the production of cellulose.

With said object in view, according to the invention, there is provided a continuous lixiviating apparatus of the type referred to, the distinguishing feature of which is that said discharge apparatus is mounted at a short distance from said other end of said trough, that said conveyors are constructed between said other end of said trough and said discharge apparatus, with auxiliary conveying means the direction of transportation of which is opposite to the principal direction of transportation of disintegrated material through said trough, and that the path of movement of said discharge apparatus passes through the space between the principal and auxiliary conveying means of said conveyors.

In a lixiviating apparatus according to the invention, the principal and auxiliary inclined conveying means of each conveyor press the lixiviated material in an ascending direction to a level above the axes of said conveyors at which level it is picked up by the discharge apparatus and carried out of said trough. Since the conveying means creating said compression of the lixiviated material are continuously moving, the lixiviated material will not adhere to the conveying means, and the danger of clogging the apparatus is therefore significantly reduced. Said danger of clogging may be further reduced by making the axial play between the discharge apparatus and the adjacent ends of the principal and auxiliary conveying means as small as mechanically feasible, whereby the portions of the conveying means immediately adjacent the discharge apparatus will be subjected to a scraping effect created by said discharge apparatus.

Instead of using a single discharge apparatus several identical or different discharge apparatuses may be used.

Another advantage of the apparatus according to the invention resides in the fact that the lixiviated material is subjected to a prepressing operation already before leaving the lixiviating apparatus thus causing lixiviating liquid to be removed from said material before it leaves the trough.

In a preferred embodiment of the invention the conveyors consist of two screw conveyors having equal pitch, but opposite winding directions and being mounted for rotation in opposite directions, the portion of each of said screw conveyors between the discharge end of said trough and said discharge apparatus having a winding direction opposite to that of the remaining portion of said screw conveyor, thereby to form said auxiliary conveying means.

In such a lixiviating apparatus, the screw blades of the two conveyors cooperate in the area below and adjacent to the discharge apparatus to compress the lixiviated material present below the discharge apparatus and between the screw conveyor shafts and to raise this material from the bottom of the trough. Moreover, the pressure exerted on the lixiviated material during its movement from the bottom of said trough to a level above the shafts of the conveyors is relieved when said material reaches said level, whereby, after a substantial part of the lixiviating liquid has been pressed out of the lixiviated material owing to the compression to which it was first subjected, the lixiviated material now acquires a loose condition which is desirable for the subsequent operations.

In another preferred embodiment of the invention the discharge apparatus consists of a bucket wheel, the buckets of which are preferably provided with teeth along their edges. During the passage of said buckets through the compressed mass of lixiviated material, the teeth provided along the edges of the buckets loosen said material whereby the discharge of said material is facilitated.

The buckets of said bucket wheel are preferably perforated so that lixiviating liquid which may be liberated from the lixiviated material during the travel thereof towards the discharge opening of the discharge apparatus will be drained into the trough. Alternatively, the discharge apparatus may comprise one or more discharge screw conveyors mounted in such a way as to convey the lixiviated material into and through a discharge trough ending outside the lixiviation trough, and the bottom of which is perforated in the portion thereof located inside the lixiviating trough so that lixiviating liquid which is pressed out of the material during its transportation by the discharge screw conveyor or conveyors may flow back into the lixiviation trough.

The invention will in the following be described in further detail with reference to the accompanying drawings, in which FIG. 1 shows one form of an apparatus according to the invention in side view, FIG. 2 a cross section through the same along the line II—II of FIG. 1 and with a part of the bucket wheel housing removed, FIG. 3 on an enlarged scale part of the apparatus of FIG. 1 in top view with the upper structure and the discharge apparatus removed, and FIG. 4 part of the bucket wheel of FIG. 2, shown in perspective view.

The apparatus illustrated in FIGURES 1–4 comprises a trough 1 disposed at a slight inclination to horizontal and supported on a row of supports 2. The lower portion of the lixiviation trough has a cross-section in the form of two adjoining circular arcs and its upper portion consists of inclined plates 3 and a cover 4 which is provided with inspection doors, not shown. The lower portion of the lixiviation trough 1 is provided with steam jackets 5 to which steam may be supplied through steam pipes 6 and from which condensate may be discharged through pipes 7. At the lower end of the lixiviation trough 1 a supply funnel 8 for the material to be lixiviated is provided on top of the lixiviation trough 1.

At a certain distance from the other end of the lixiviation trough 1 there is provided a discharge apparatus 9 in the form of a bucket wheel which is contained in a housing 10 having a discharge opening 11 through which the material removed from the lixiviation trough 1 by the buckets of said bucket wheel is carried outside of the lixiviating apparatus to conveying means, not shown.

As will clearly appear from FIGS. 2 and 4, the buckets consist of bucket plates 12, the outer edges of which are provided with teeth 13 which during the passage of the bucket wheel through the compressed material in the lixiviation trough cause said material to be loosened. The inner edges of the bucket plates 12 are welded to two perforated plates 14 and 15 of which the former 14 forms the rear part of the buckets and of which the latter 15 forms an extension of the bucket plate 12 and thus a roof in the inner portion of the following bucket. The ends of said perforated plates are welded to side plates 39 which in turn are welded to a central part 40 of the bucket wheel. As shown in the drawing, teeth 13 may be provided on the side plate 39 between the rear edge of the bucket plates 12 and the central part 40 of the bucket wheel.

The bucket wheel is mounted on a shaft 16 one end of which is supported in a bearing 17 mounted on a supporting structure 18 above the lixiviation trough 1. The other end of the shaft 16 is supported in another bearing 19 which together with a gear means 20, which is inserted between the shaft 16 and a motor 21, is mounted on a platform 22 located at the upper end of the lixiviation trough.

Two screw conveyors 25 and 26 are rotatably mounted in the lixiviation trough 1 on parallel shafts 23 and 24 and are driven by two separate driving units arranged at the lower end of the trough. The driving unit illustrated in the drawing consists of a motor 27 and a suitable gear transmission 28 connected thereto, which gear transmission over a chain drive is connected to the shaft 23 of the screw conveyor 25. The shaft 23 of the screw conveyor 25 is mounted at the lower end of the lixiviation trough in a bearing 29 mounted on a support.

Corresponding driving means are provided for the shaft 24 of the screw conveyor 26.

The screw conveyors are rotatably mounted in double bearings 30 at the upper end of the lixiviation trough. Said screw conveyors have equal diameter and pitch but opposite winding directions and rotate in opposite directions. The screw blade or flight of the screw conveyor 23 consists of two sections 31 and 32 having opposite winding directions and of which the upper section 32 is very short.

Figure 3:
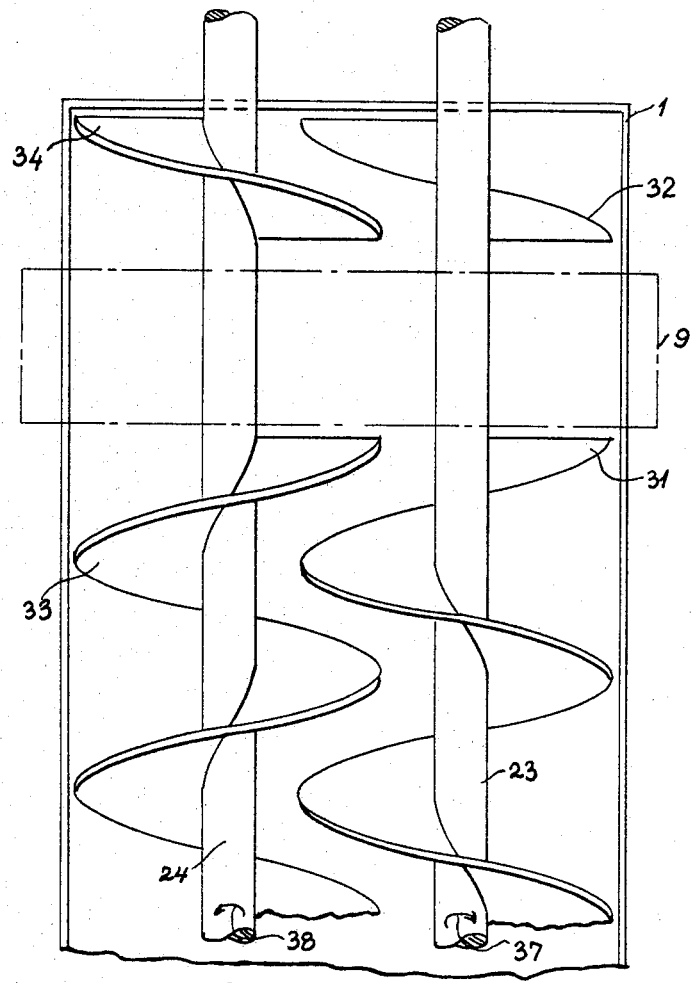

The corresponding screw blade sections or flight sections on the screw conveyor 24 are denoted in FIG. 3 by the reference characters 33 and 34.

The bucket wheel is mounted in such a position above the screw conveyor shafts that during rotation of the bucket wheel about the shaft 16 the buckets travel in a path which leads down into the space between the two screw blade sections 31 and 32 of the screw conveyor 23 and the corresponding sections 33 and 34 of the screw conveyors 24 without touching the shafts or the screw blade sections of said screw conveyors.

The screw blades or flights of the screw conveyors are provided with a multitude of holes (not shown) uniformly distributed over their area which holes allow the lixiviating liquid supplied to the lixiviation trough to one or more inlets (not shown) at the upper end thereof to pass down through the lixiviating trough from which it is discharged in the form of an extract through a pipe 35 located at the lower end of said trough.

When extracting sugar from cane in the apparatus according to the invention the disintegrated sugar cane are introduced into the lower end of the lixiviation trough through the supply funnel 8. The screw conveyors 25 and 26 cause the disintegrated material to move towards the discharge apparatus in counter current to the lixiviation liquid. Said movement is effected when the screw conveyors rotate in the direction indicated in FIG. 3 by the arrows 37 and 38. At the same time steam may be introduced into the steam jackets to heat the disintegrated material and the lixiviation liquid to expedite the extraction of sugar. During the continuous passage of disintegrated material through the lixiviation trough towards the upper end thereof the lixiviated material is moved into the area between the screw blade sections 31, 32 and 33, 34 respectively. Since the screw blade sections 32 and 34 have winding directions opposite to those of the remaining sections of the screw conveyors the lixiviated material is subjected to a compression in the area between said screw blade sections. Owing to this compression the material located in the area between the screw blade shafts 23 and 24 is raised to a level above a plane through the shafts of the screw conveyors. While the material is subjected to the said compression lixiviating liquid is pressed out and said lixiviating liquid flows towards the lower end of the lixiviation trough. After having been raised to a level above the shafts of the screw conveyors, the disintegrated material is relieved of the pressure exerted thereon, whereby said material acquires a loose condition which is desirable for the subsequent treatment thereof.

After having been raised to a level above the shafts of the screw conveyors, the lixiviated material is picked up by the buckets of the bucket wheel and is moved around with said buckets to the discharge opening 11. During the rotation with said bucket wheel lixiviating liquid may be liberated and may flow back into the lixiviation trough after having passed the perforated plates 14 or 15.

Simultaneously with the removal of lixiviated material from the trough by means of the buckets the teeth 13 provided on the buckets cause a disintegration of compressed lumps of lixiviated material.

We claim:
1. A continuous lixiviating apparatus of the type comprising a trough inclined from the horizontal, at least two intermeshing helical screw conveyors having oppositely winding direction mounted side by side in said trough for rotation about mutually parallel axes extending longitudinally of said trough, a discharge apparatus mounted near the upper end of said trough, each of said conveyors having a principal helical screw portion extending from the lower end of said trough to adjacent said discharge apparatus, said principal screw portions being adapted to convey disintegrated material supplied to the lower end of said trough in a principal direction of transportation toward said discharge apparatus countercurrent to the downward flow of lixiviating liquid, each of said conveyors having an auxiliary helical screw portion in the upper end of said trough spaced from the principal screw portion and having a direction of transportation which is opposite to the principal direction of transportation of disintegrated matter through said trough, said discharge apparatus comprising a further conveyor having its operative portion above and moving transversely to the axis of rotation of said screw conveyors and being mounted such that the path of movement of said further conveyor passes through the space between the principal screw portion and the auxiliary screw portion of said conveyors.

2. Apparatus as in claim 1, in which the discharge apparatus consists of a bucket wheel.

3. Apparatus as in claim 2, in which the buckets of said bucket wheel are provided with teeth along their edges.

References Cited

UNITED STATES PATENTS

| 2,547,577 | 4/1951 | Hamacher | 23—270 |
| 2,713,009 | 7/1955 | Bruniche-Olsen | 23—270 X |
| 3,142,419 | 7/1964 | Burke | 222—413 X |
| 3,225,968 | 12/1965 | Winkley | 222—413 X |
| 3,338,472 | 8/1967 | Gardner | 222—413 X |

FOREIGN PATENTS

| 546,960 | 9/1922 | France. |
| 598,703 | 10/1925 | France. |
| 568,328 | 3/1945 | Great Britain. |
| 869,258 | 5/1961 | Great Britain. |
| 996,731 | 6/1965 | Great Britain. |
| 90,097 | 8/1937 | Sweden. |

NORMAN YUDKOFF, *Primary Examiner.*

S. J. EMERY, *Assistant Examiner.*

U.S. Cl. X.R.

127—7; 198—104; 222—413